ically produced on a continuous basis is desirable.

United States Patent Office 3,427,638
Patented Feb. 11, 1969

3,427,638
AUTOMATIC DEVICE FOR PRODUCING EXPANDED TUBING
John R. Vukovich, Midland, Mich., assignor to Dow Corning Corporation, Midland, Mich., a corporation of Michigan
Filed Apr. 18, 1967, Ser. No. 631,627
U.S. Cl. 18—19  2 Claims
Int. Cl. B29c 11/00

ABSTRACT OF THE DISCLOSURE

Apparatus for producing expanded tubing, wherein air pressure is supplied to the tubing interior and the tubing is expanded into contact with the interior surface of a mold pipe. The tubing supply is held in a gas-tight chamber, expansion gases being fed into the end of the tubing on a supply reel. Pressure differential is maintained between the interior and exterior of the tubing in the supply chamber to prevent rupture of tubing within the chamber, and a gland is provided at the point of exit of the tubing from the chamber to provide a gas-tight seal.

Background of the invention

The present invention relates to the manufacture of polymeric tubing, and more particularly to the manufacture of expanded tubing having a plastic memory.

Polymeric materials having plastic memory are rapidly finding uses in industry. By tubing having plastic memory is meant tubing of polymeric material which is heat unstable; that is, materials which are treated in a manner which allows them to retain their shape and dimensions under low normal temperature conditions; but which when heat is applied in sufficient amount to raise them to a critical temperature, tends to cause them to shrink to substantially their pretreatment dimensions. Material having these characteristics is commonly called "heat shrinkable." Such materials are described, for example, in U.S. Patent No. 3,086,242.

Particularly in fields such as electrical insulation, this characteristic has found many applications. A cap, for example, may be slipped into a sleeve of heat shrinkable tubing; and by application of heat, the material contracts to form a tight insulating sheath around the cap. Various methods have been used heretofore in manufacturing heat shrinkable tubing, but a problem inherent in such production has been the difficulty in economically producing long lengths having controlled outside diameter, wall thickness, and linear dimensions.

A system for producing tubing of this type is described in U.S. Patent No. 3,257,689. In that patent, lengths of expanded tubing are positioned inside a solid mold pipe, wherein expansion is accomplished by means of air pressure within the tubing while the tubing is heated. The tubing is then cooled while being held in expanded condition causing it to set in its expanded form. While the system described in the aforesaid patent is a practical one, it has the primary disadvantage that the length of tubing produced in the system is limited by the length of the mold pipe. It would be desirable to produce tubing in a continuous length rather than in relatively short lengths.

Summary of the invention

In accordance with the present invention, there is provided apparatus for automatically producing extended lengths of expanded polymeric tubing. A mold pipe with a heating and cooling jacket of the type disclosed in the aforesaid U.S. Patent No. 3,257,689, are used in conjunction with a tubing supply carrying pressure chamber together with tubing advance means, whereby continuous lengths of tubing can be fed throughout the mold pipe.

Thus, the present invention inherently has all of the advantages set forth in the aforesaid patent while eliminating the disadvantage of dependency of tubing lengths on mold pipe length. Additionally, since much material handling is eliminated, the device of the present invention eliminates much of the labor cost inherent in producing expanded tubing by previous methods. Various other objects and attendant advantages will become obvious to those skilled in the art from a consideration of the following detailed description when read in connection with the accompanying drawings.

Description of preferred embodiments

Figure 1:
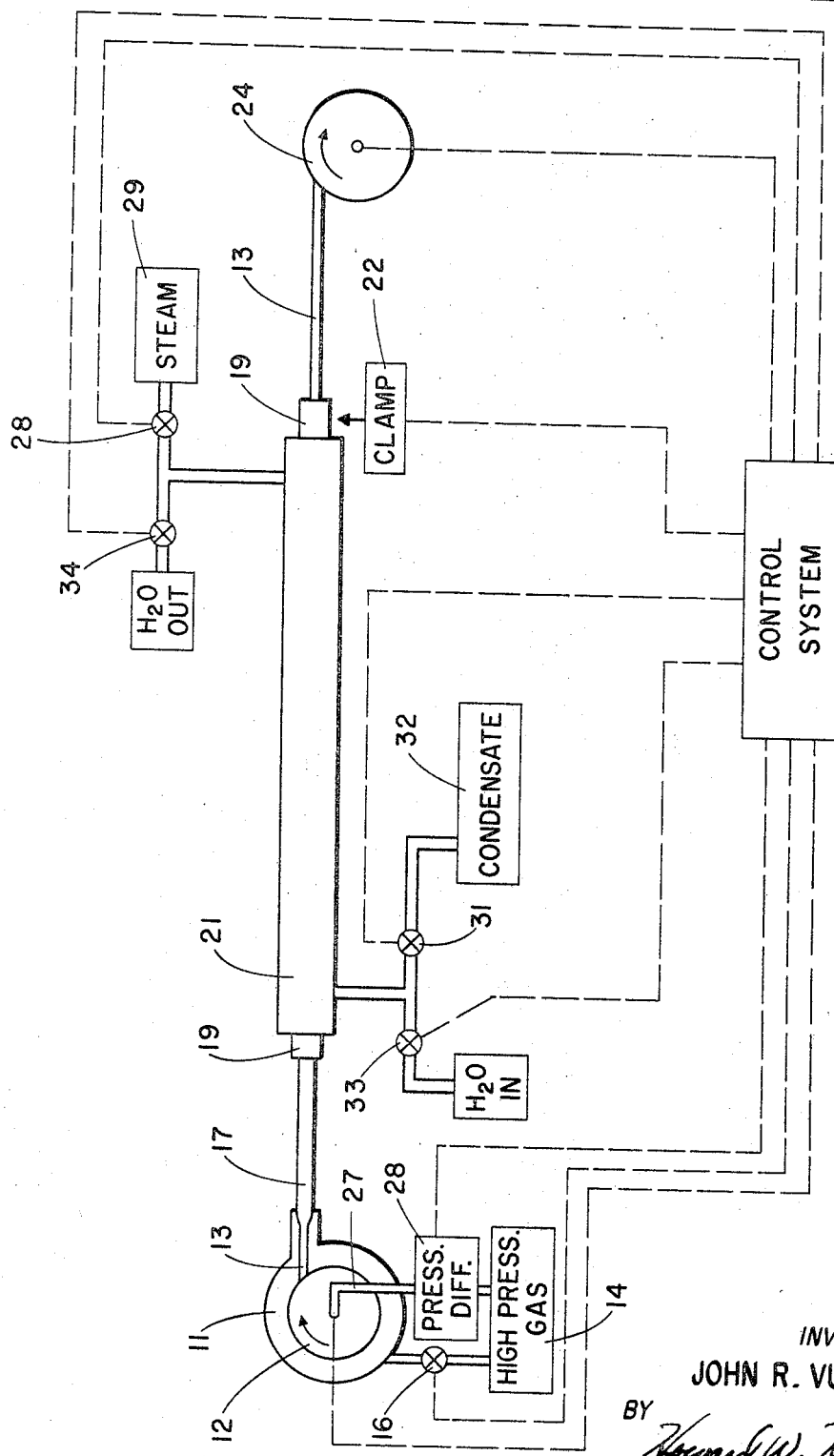
FIGURE 1 is a diagrammatic view of apparatus for producing expanded tubing in accordance with the present invention.

Referring now to the drawings wherein like reference numerals designate like or corresponding parts throughout the figures thereof, there is shown in FIGURE 1 a chamber 11 containing therein a reel 12 upon which is carried a supply of collapsed, expandable tubing 13 which is to be expanded prior to use. The chamber 11 may be of metal, or the like, and must be gas tight. High pressure gas from a source 14 is fed into the chamber 11 through a controllable valve 16. Additionally, high pressure gas is fed from the source 14 into the end of the tubing 13 by means such as a rotary gland built into the reel 12. Rotary glands for providing paths for gas communication between a fixed supply and a rotating member are well known in the art of fluid transmission and are, therefore, not described in detail herein.

Figure 2:
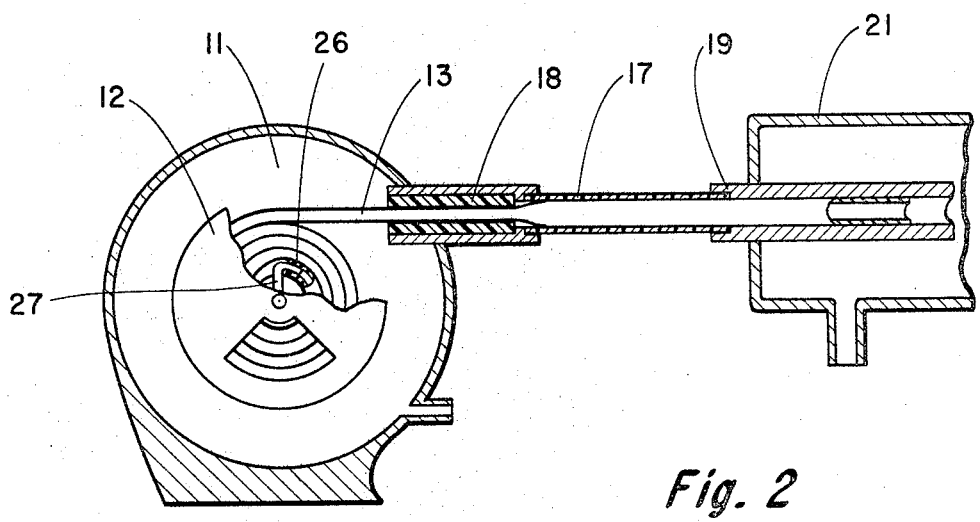
FIGURE 2 is an enlarged fragmentary cross-sectional view of the tubing supply chamber and mold pipe inlet of FIGURE 1.

As may be seen more clearly from FIGURE 2, the unexpanded tubing 13 passes from the reel 12 into a flexible tube 17 after passing through a sealing gland 18, which may be, for example, of nylon or similar material. The need for the gland 18 will become readily apparent from the description of the operation of the system. The reinforced flexible tubing 17 is connected to the mold pipe 19. The mold pipe 19 is used to shape the tubing to its desired configuration, as will be described in greater detail hereinafter. The mold pipe 19 is encircled by a heating and cooling jacket 21 to which are connected by valves sources of steam and cooling water, as well as water and condensate outlets.

Figure 3:
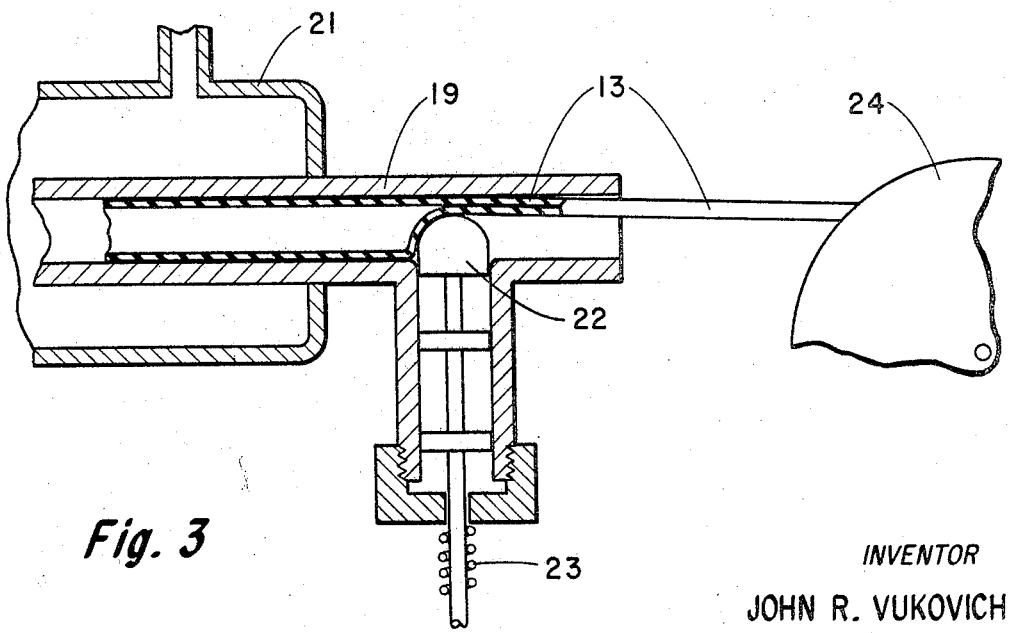
FIGURE 3 is a fragmentary cross-sectional view of the exit end of the mold pipe of FIGURE 1 showing details of a preferred embodiment of clamping means.

As may be seen more clearly from FIGURE 3, near the point where the mold pipe 19 emerges from the heating and cooling jacket 21, there is provided a clamping means 22 which may be, for example, a dome-shaped member having a diameter substantially equal to the diameter of the mold pipe 19, and which is operated by a solenoid 23, or by suitable hydraulic means. The tubing then emerges from the mold pipe 19, and is wound on a take-up reel 24.

In operation, a reel 12 having a supply of unexpanded tubing 13 is mounted within the chamber 11. Alternatively, to using a reel, a supply of loosely coiled tubing may simply be placed in the chamber 11. The innermost end 26 of the tubing 13, as may be seen from FIGURE 2, is placed in communication with an air passage 27, which in turn is in communication with the high pressure gas source 14 through a pressure differential valve 28. The tubing 13 is threaded through the gland 18, flexible tube 17, mold pipe 19, and on to take-up reel 24. The tubing 13 is clamped at the outlet end of the mold pipe 19 by means of the clamp 22 to prevent any passage of gas through the tubing beyond the clamp. Valve 28 connected to a steam source 29 is opened to allow steam to enter the jacket 21 surrounding the mold pipe and heat the tubing therein. At the same time the outlet valve 31 connected to the condensate drain 32 is also open to provide an outlet for the steam as it is cooled. Compressed gas, which may be air, for example, is supplied by the pressure differential valve 28 to the interior of the tubing 13 by means of the gland provided at the center of the reel 12. This air causes the tubing 13 to expand and form a seal against the inlet surface of the gland bushing 18 provided at the tubing outlet from the chamber 11.

After the seal between the tubing 13 and the gland bushing 18 has been formed, the valve 16 is opened and high pressure gas is allowed to flow into the chamber 11, as well as into the tubing 13. The pressure differential between the interior and exterior of the tubing 13 is maintained, however, to prevent breakage of the seal between the tubing and the gland bushing 18. It has been found in practice that a pressure differential of as little as 10 p.s.i. can maintain this seal effectively.

By providing pressure within the chamber 11 and outside of the tubing 13, substantial pressure can be applied to the interior of the tubing without danger of its bursting due to lack of confinement. The pressure must be applied to cause the tubing to expand within the mold pipe 19 to conform to the mold pipe diameter.

When the tubing 13 has been expanded to conform with the interior surface of the mold pipe 19 and the tubing 13 has been heated sufficiently to raise it to its critical temperature, that is, the temperature at which the set becomes semipermanent upon cooling, the steam supply 29 is shut off. Cooling water is then caused to enter the jacket 21 by an opening of the valve 33, and the water outlet valve 34 which is connected to a water drain. The cooling of the tubing 13 to below its critical temperature causes the tubing to assume, until reheating, the mold pipe dimensions. A pressure from within the tubing is released, and then air pressure within the chamber 11 is also released. The clamp 22 is now retracted and a length of tubing 13, equal to or slightly less than the length of the mold pipe 19, is wound on the take-up reel 24. The clamp 22 is then again applied to the tubing 13 and the pressurizing, heating and cooling cycles are repeated sequentially.

Thus, there has been disclosed a system for expanding long lengths of tubing having heat shrinkable characteristics. The controls for the necessary valves and switches to operate the system automatically in a sequential fashion are available commercially, or can easily be provided in accordance with principles familiar to those skilled in the art. Such systems, as is well known, may operate by mechanical, electrical or hydraulic means.

Obviously, many variations and modifications of the aforedescribed system will become obvious to those skilled in the art from a reading of the foregoing. It is to be understood, therefore, that within the scope of the appended claims the invention may be practiced otherwise than as specifically described.

That which is claimed is.

1. In apparatus for production of expanded tubing, said apparatus having a mold pipe substantially equal to the desired external diameter of the finished tubing and adapted to confine tubing expanded by induction into the tube of gas under pressure, the improvements which comprise:
   a supply of unexpanded tubing substantially greater than the length of said mold pipe,
   a gas-tight chamber confining said supply of tubing, gland means interposed between said chamber and said mold pipe for radially confining tubing at at least one point between said chamber and said mold pipe, means for clamping said tubing at the exit end of said mold pipe, means for supplying gas under pressure to the interior of said tubing to expand said tubing into sealing contact with said gland means, and means for supplying gas under pressure to the exterior of said tubing in said chamber to prevent over expansion of the tubing in said chamber while allowing expansion of the tubing within said mold pipe.

2. Improvement as defined in claim 1, wherein said means for supplying gas to the exterior of said tubing includes means for supplying said gas at a pressure below that of the gas supplied to the interior of said tubing.

References Cited
UNITED STATES PATENTS
| | | |
|---|---|---|
| 2,494,273 | 1/1950 | Wigal. |
| 3,049,762 | 8/1962 | Jackson. |
| 3,277,525 | 11/1966 | Buschman et al. |
| 3,370,112 | 2/1968 | Wray. |

WILLIAM J. STEPHENSON, *Primary Examiner.*

U.S. Cl. X.R.

18—6